United States Patent [19]

Röhm

[11] Patent Number: 4,627,628
[45] Date of Patent: Dec. 9, 1986

[54] HAMMER DRILL CHUCK

[76] Inventor: Günter H. Röhm, Heinrich-Röhm-Str. 50, 7927 Sontheim, Fed. Rep. of Germany

[21] Appl. No.: 703,888

[22] Filed: Feb. 21, 1985

[30] Foreign Application Priority Data

Feb. 24, 1984 [DE] Fed. Rep. of Germany ....... 3406668

[51] Int. Cl.[4] ............................................. B25D 17/08
[52] U.S. Cl. ..................................... 279/20; 279/1 K; 279/19.3; 279/62; 408/241 R
[58] Field of Search ............ 279/1 K, 1 ME, 19, 19.3, 279/19.4, 19.5, 60–65, 20, 1 R; 408/241 R

[56] References Cited

U.S. PATENT DOCUMENTS 1,407,589  2/1922  Slater ................................. 279/19.3

FOREIGN PATENT DOCUMENTS 2030485  4/1980  United Kingdom .................. 279/19

*Primary Examiner*—Gil Weidenfeld
*Assistant Examiner*—Steven C. Bishop

*Attorney, Agent, or Firm*—Karl F. Ross; Herbert Dubno

[57] ABSTRACT

A drill chuck for a hammer drill with a plurality of clamp jaws fed in feed channels to engage a drill in a tool holder, the clamp jaws being adjustable by means of a support ring, the support ring bearing a restraining casing having teeth thereon which can engage gearing in the support ring so as to lock it against further rotation. The restraining casing is lockable in two axial positions, in one position in engagement with the support ring, in the other out of engagement with the support ring. The restraining casing is slid into engagement with the support ring in a covering jacket which holds the restraining casing axially tightly so that drilling waste can not impede engagement of the restraining casing with the support ring. Cleaning passages run through the chuck body from the tool holder to the surroundings so that drilling waste will be removed from the tool holder and the chuck interior during drilling operation. Similarly by opening the feed channels to the surroundings, as is done for the cleaning passages, drilling waste may also leave the chuck through the feed channels as well.

9 Claims, 7 Drawing Figures

HAMMER DRILL CHUCK

CROSS REFERENCE TO RELATED APPLICATION

This application is related to my copending application Ser. No. 545,791, filed Sept. 26, 1984 corresponding to German patent document - utility model DE-GM No. 83 27 665.3.

FIELD OF THE INVENTION

My present application relates to an improved drill chuck for rotary impact drills.

BACKGROUND OF THE INVENTION

A drill chuck for a hammer drill can have a chuck body connected to a drill spindle, the chuck body having a tool holder for the drill and an axial open passage through which the hammer action of the drill spindle is transmitted to the end of a drill bit, which is held in the tool holder between clamp jaws, which are advanced and retracted by means of a rotatable and axially nonshiftable support ring. A manually rotatable covering jacket engages the ring to rotate it and a restraining sleeve is nonrotatable on the chuck body but shiftable between two axial positions, the restraining casing having teeth on its end turned toward and directed to the support ring, and oriented to engage gearing on the support ring, whereby those teeth mesh with that gearing when the restraining casing is shoved toward and against the support ring so that the support ring is prevented from undesired rotation during operation and, when the restraining casing is pushed back from the support ring, the teeth are freed from engagement with the gearing of the support ring so that the clamp jaws may be advanced or retracted.

With this kind of drill chuck, for example constructed as shown in German patent document DE-GM No. 83 27 665 and the above-identified application, drilling waste, like borings, cuttings and powders, arising in the drilling process can contaminate and jam the chuck. Particularly when the drill is directed in the upwards direction to drill a hole from below, the drilling waste from the drill hole falls directly down into the open hollow space of the drill chuck and particularly enters the tool holder or between the working surfaces in the chuck body on the one hand and into the actuating jacket on the other hand and then accumulates in places from which it penetrates more deeply into the drill chuck. In time then these drilling wastes can impair the functioning of the drill chuck. Then the drill chuck must be taken apart and cleaned which as a rule requires expensive work not practical for one who is a layman. Particularly the engagement of the restraining casing with the support ring and the motion of the clamp jaws as they are advanced and retracted can be impaired by the drilling wastes.

OBJECTS OF THE INVENTION

The principal object of the invention is to improve upon the chuck of the aforementioned application so that the drilling waste does not accumulate in the drill chuck and the drill chuck will not be handicapped by detritus accumulation during the drilling operation.

It is another object of this invention to provide a drill chuck of the above-described kind whose operation will not be impaired by the accumulation of drilling waste such as cuttings, powders, borings and the like.

It is a further object of the invention to provide a drill chuck which does not need to be frequently broken down during operation and cleaned due to accumulation of drilling wastes.

Still another object of the invention is to provide an improved drill chuck which obviates drawbacks of prior art hammer drill chucks.

SUMMARY OF THE INVENTION

These objects and others are attained in accordance with the invention in a rotary hammer drill chuck which has a chuck body keyed to a drill spindle for rotation therewith but enabling axial movement of the spindle relative to the chuck body, the chuck body having a tool holder for the drill and an open axial passage therein through which the hammer action of the drill spindle is transmitted to the end of a drill bit.

The bit is held in the tool holder between clamp jaws, which are advanced and retracted by means of an adjustable rotatably and axially nonshiftable operating ring bearing a manually actuatable cylindrical covering jacket.

A locking sleeve is shiftable between two axial positions, nonrotatably on the chuck body.

The locking sleeve has teeth on its end turned toward the support ring, which are oriented toward and can mesh or interlock with gearing on the support ring when the restraining casing is pushed toward and against the support ring whereby the support ring is prevented from undesired rotation during the drilling operation. When the locking sleeve is pushed back from the operating ring, the teeth no longer mesh with the gearing on the operating ring so that the clamp jaws can be advanced or retracted.

According to my present invention the actuating sleeve or jacket is provided with radial clearance from the outer circumferential surface of the chuck body and the locking sleeve extends into and is held in the circular space between the chuck body and the actuating jacket, wherein the actuating jacket overlaps snugly the locking sleeve.

Another essential feature is the provision of cleaning passages in the chuck body. These cleaning passages lie axially beyond the circular space or radial clearance and open to the surroundings at a position unblocked by the restraining casing.

Advantageously the actuating sleeve overlaps the restraining casing axially to a sufficient extent that, when the restraining casing is in its position out of mesh with the support ring and pushed back from it, the part of the circular space emptied by the pushed-back restraining casing is still covered by the jacket.

With a drill chuck, in which the clamp jaws run slantingly in feed channels inclined to the axis of the chuck, the feed channels as well as the cleaning passages open onto the outer circumferential surfaces of the drill chuck axially beyond the circular space at a position not blocked by the locking sleeve.

In the drilling process accumulating drilling waste will not be retained between the actuating sleeve and the chuck body and therefore the locking sleeve action will not be impaired.

The teeth of the locking sleeve mesh directly with those of the operating ring so that the covering jacket remains unburdened by the locking sleeve and, therefore as would be expected, can be constructed of a comparatively thin material.

Moreover by the axial overlapping arrangement of the actuating jacket and the locking sleeve an axially shorter form for the drill chuck is possible. The prerequisites for that construction are that the cleaning passages and feed channels are open freely to the outer circumferential surfaces of the chuck body at a position in which they are not blocked by the locking sleeve or the actuating jacket, so that the discharge of the drilling waste is not impaired.

The drilling waste, which in the drilling process collects in the tool holder of the drill chuck, and under the action of centrifugal force passes through the cleaning passages is readily discharged; since the drilling waste also penetrates into the feed channels for the clamp jaws, it is also transported directly to the outside in and through the feed channels, so that it does not collect in the drill chuck and penetrate deeper between moving parts or parts moving by one another.

Advantageously the mouths of the cleaning passages in the tool holder are adjacent the axial passage, whereby the further danger that the drilling waste may accumulate in the axial passage at its front is avoided. The drilling waste could collect between the end of the drill spindle or hammer head thereof on one hand and the drill bit on the other in the axial passage and impede the action of the hammer stroke on the drill bit end.

Advantageously the cleaning passages diverge toward the spindle side of the drill chuck at a sharp angle to the chuck axis. That has the advantage that in overhead drilling the force of gravity assists the centrifugal force in the transport of drilling waste from the drill chuck through the cleaning passages. This force of gravity can moreover be of further use in the removal of drilling waste when the openings or mouths of the cleaning passages or the feed channels in the outer circumferential surface of the drill chuck are overlapped apronlike with radial clearance by the locking sleeve so as to define a free space between the chuck body and the restraining casing.

This free space is axially open to the surroundings at the spindle side of the chuck body so that drilling waste that enters the free space from the cleaning passages or the feed channels will fall out during overhead drilling. Also by that structure drilling waste discharged through the mouths of the cleaning passages or the feed channels is not slung radially directly from the rotating drill chuck.

In addition the overlapping of the locking sleeve by the actuating jacket allows the cylindrical portion of the locking sleeve beyond the jacket to have its outer circumferential surface axially flush with that of the actuating jacket. Thus the restraining casing does not enlarge the outer diameter of the drill chuck so that the drill will be made with the normal, commonly used diameter and thus fits in the usual openings in drill stands for receiving a chuck.

Indexing members are provided and arranged on one of the chuck bodies and the locking sleeve to hold the locking sleeve releasably fixed in each of its two axial positions without preventing manual shifting therebetween.

Advantageously each indexing or detent member is a spring plate freely cut out of the casing wall in the locking sleeve axially, which with a lock nose advantageously provided at its free end engages one of two lock recesses or indentations which are spaced axially from one another to determine the relative axial positions for the locking sleeve.

When the operating ring is rotatable by a key engageable in the chuck body, the key having a toothed beveled edge (beveled pinion) that meshes with a toothed rim of the operating ring, the locking teeth engage each other with a flank angle of between 45° and 90°.

In this manner I can guarantee that the exerted torque on the operating ring by the key will cause the locking teeth of the locking sleeve and operating ring to cam each other apart and thus press the locking sleeve out of engagement, although this structure is also sufficiently stable so that the locking sleeve will not be disengaged from the support ring during drilling. Thus it is not indispensible for key operation of the support ring for the locking sleeve to be pushed fully back from the support ring. Moreover I may construct the teeth on the restraining casing and the gearing of the support ring saw-toothed in shape to allow an even easier lift-out of the teeth of the locking sleeve from the support ring.

A second embodiment of the invention corresponds to a second type of locking apparatus for holding the restraining casing in its two axial positions. The locking apparatus comprises advantageously a plurality of axially extending ribs distributed circumferentially on the inner surface of the locking sleeve projecting against the chuck body so that each rib engages one of two axially extending recesses or notches lying partially overlapping side-by-side in the circumferential direction in the chuck body. Each pair of notches is so constructed that one notch is substantially shorter axially than the other so that when the shorter grooves are engaged by the ribs of the locking sleeve, the locking sleeve is held out of engagement with the operating ring, but when the longer grooves are engaged by the ribs of the locking sleeve, the teeth of the locking sleeve engage those of the operating ring. An axially effective sleeve spring is provided to press the locking sleeve toward the operating ring and to hold it in position.

BRIEF DESCRIPTION OF THE DRAWING

The above and other objects, features and advantages of the invention will become more readily apparent from the following detailed description, reference being made to the accompanying drawing in which.

SPECIFIC DESCRIPTION

Figure 1:
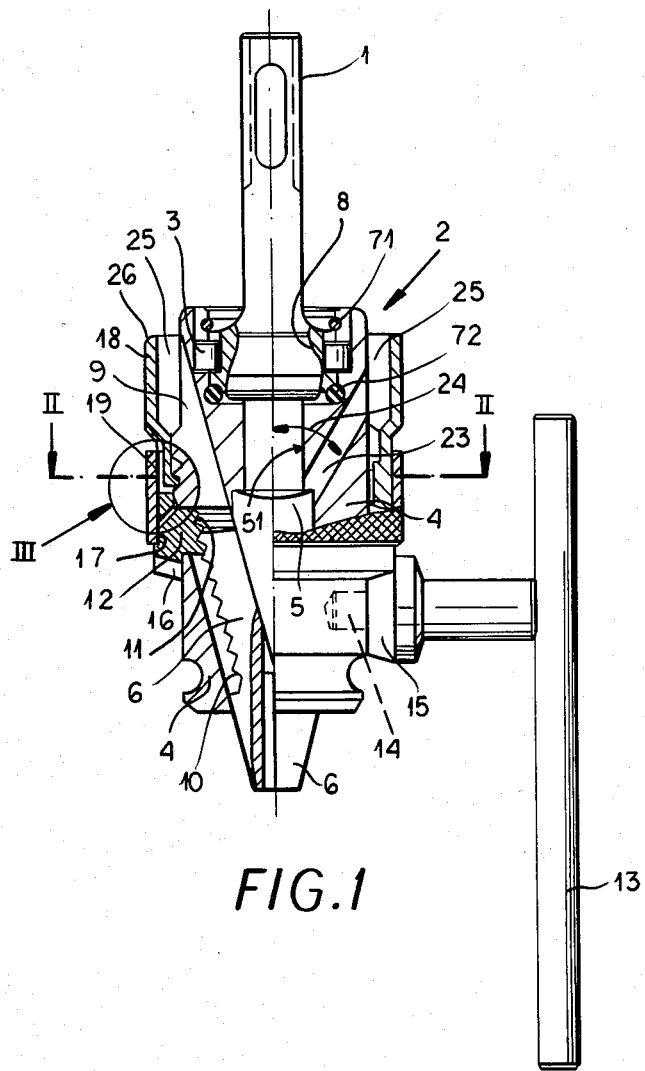
FIG. 1 is an axial cross section of the drill chuck of a preferred embodiment of this invention.

The drill chuck 2 is held on the drill spindle 1 by two pins 3 so as to rotatably couple the chuck body to the spindle without hindering the axial slidability of the drill chuck 2 on the drill spindle 1.

The chuck body 4 of the drill chuck 2 has a tool holder 5 for the drill bit which has not been illustrated and an axial open cavity 51 in the tool holder 5.

The hammer stroke of the drill spindle 1 will be transmitted directly onto the end of the drill shank held between clamp jaws 6 in the tool holder 5 down through axial open cavity 51.

Thus the chuck body 4 and with it the drill chuck 2 is decoupled on the whole from the hammer blows of the drill spindle 1, so that the chuck body 4, which is axially slightly shiftable on the drill spindle 1 in both directions, is braced elastically against the collar 8 of the drill spindle 1 by elastic rings 72 and 71.

The clamp jaws 6 are displaced in feed channels 9 running slantedly to the chuck axis and engage with the teeth 10 the inner threads 11 of the operating ring 12, which is mounted rotatably in an annular groove in the chuck body 4. So that it can be inserted in this annular groove, the operating ring 12 is transversely divided. Both semicircular portions of operating ring 12 are held together by actuating jacket 19 which is slid axially over the support ring 12. Actuating jacket 19 is held firmly on support ring 12, and is constructed from thin sheet metal. Actuating jacket 19 is clenched or swaged into the groove 17 of the operating ring 12 adjacent the drill side or front side of operating ring 12.

The operating ring 12 can be rotated by hand by gripping the externally knurled surface of jacket 19 or by means of a key 13 which can be engaged in the chuck body 4 in a guide recess with the guide pin 14.

The key 13 has toothing 15 on a beveled edge which engages the front gearing 16 of the operating ring 12.

Further a locking sleeve 18 is nonrotatably held to the chuck body 4, but is axially shiftable thereon between its two axial positions.

Figure 3:
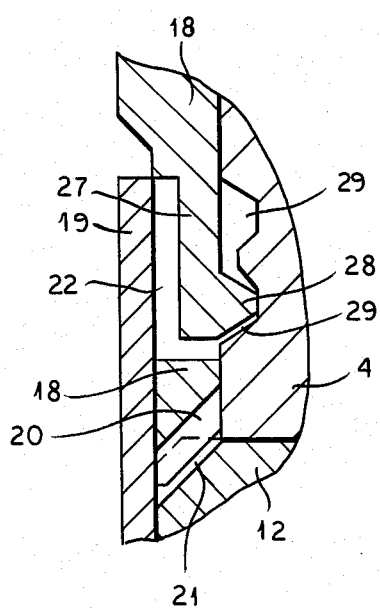
FIG. 3 is a partial axial cross section of the region III of FIG. 1.

As can be learned from the enlargement of FIG. 1, seen in FIG. 3, the locking sleeve 18 has a toothed edge 20 turned toward operating ring 12, which provides a crown or ring gear on that edge, which is oriented toward the opposed ring gear 21 on operating ring 12.

The locking sleeve 18 is slidable axially to engage ring 12 so that the locking teeth 20 of the sleeve 18 mesh with the opposing locking teeth 21 of the operating ring 12 and thereby stop undesired rotation of the ring during drilling.

In the position slid back from the operating ring 12 the teeth 20 of the locking sleeve 18 are out of mesh with the opposing gearing 21 of the ring 12 so that the ring 12 is freely rotatable.

The actuating sleeve 19 is positioned with radial clearance from the outer circumferential surface of the chuck body 4 and constructed with a circular space 22 between it and chuck body 4. In this circular space 22, the locking sleeve 18 engages the gearing on the ring 12. Hence the restraining casing 18 is snugly overlapped by the jacket 19 and of course extends axially far enough so that the jacket 19 also covers the circular space 22 and the drillwardly directed end of the sleeve 18 when the sleeve 18 is pushed back into its position out of engagement with ring 12.

Cleaning passages 23 are provided in chuck body 4 which open at one end into the tool holder 5 adjacent axial cavity 51 and at the other end onto the outer circumferential surface of chuck body 4, which lie axially above and beyond circular space 22 and are not blocked by restraining sleeve 18.

These cleaning passages 23 diverge toward the spindle side of the drill chuck and are inclined to the chuck axis at sharp angle 24 to the drill side. Also the feed channels 9 open, as the cleaning passages 23 do, onto the outer surfaces of the chuck body 4 above and beyond the circular space 22 and at a position unblocked by the sleeve 18.

Drilling waste retained between the clamp jaws 6 in the tool holder 5 can therefore directly go through the cleaning passages 23 into the surroundings. Of equal value for the drilling waste removal from the tool holder 5, the drilling waste can penetrate through the feed channels 9.

On the outside of the chuck body 4 the cleaning passages 23 or the feed channels 9 open directly to the surroundings. The outside mouths of the cleaning passages 23 and/or feed channels 9 can be protectably covered by the sleeve 18 but with radial clearance therefrom so as not to block them. Thus the restraining casing 18 acts as a kind of apron and the cleaning passages 23 or feed channels 9 are open thereby through the axially freely open space 25 to the surroundings.

The free space 25 is located between the chuck body 4 and the restraining sleeve 18 and open axially to the surroundings at the edge 26, so that, for example in overhead drilling, drilling waste from the cleaning passages 23 or the feed channels 9 and from the free space 25 can drop out under the force of gravity.

Figure 4:
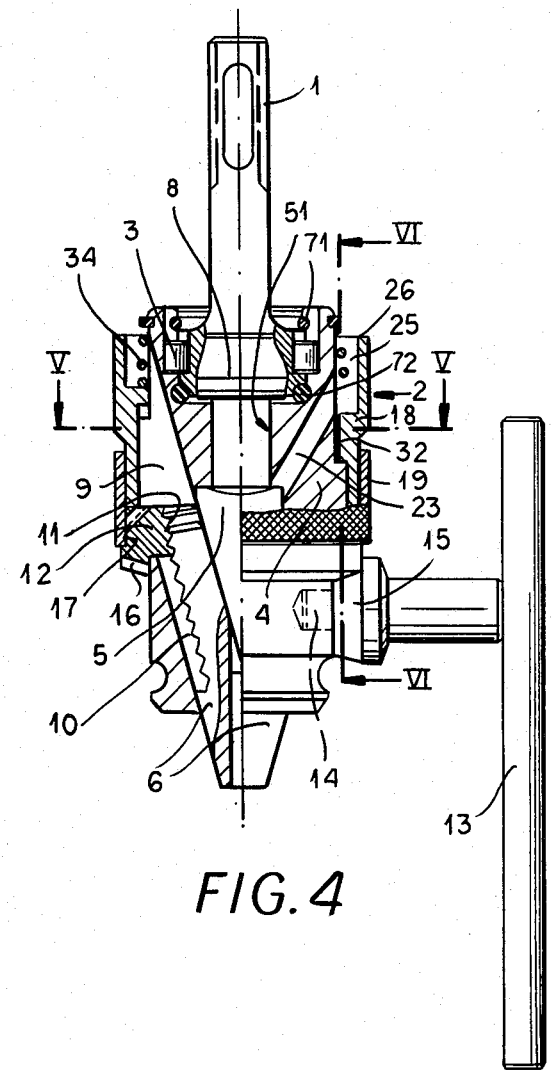
FIG. 4 is an axial cross section showing a second embodiment of this invention.

From FIGS. 1 and 4 one sees moreover that sleeve 18 with reference to its outer circumferential surface extending out from the circular space 22 is flush axially with the jacket 19. The sleeve 18 hence does not enlarge the outer diameter of the drill chuck 2 as a whole.

Moreover indexing or detent members are provided between the chuck body 4 and the covering jacket 19. These detent members hold the sleeve 18 locked in each of its two axial positions.

Figure 2:
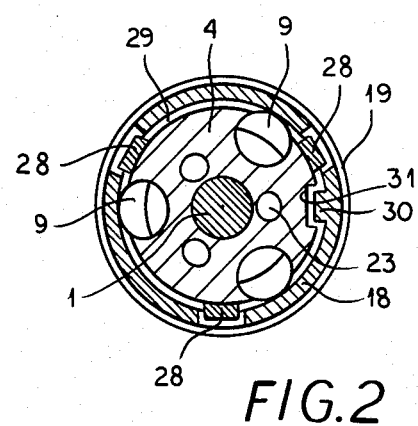
FIG. 2 is a cross section taken along the line II—II of FIG. 1.

In the embodiment of FIGS. 1 to 3 each detent member is structured into the casing wall of the sleeve 18 in the form of spring plates 27 cut and bent from the sleeve, which with the lock nose 28 provided at the free end of spring plate 27 grips in either one of two detent recesses 29 spaced axially from each other. The two recesses 29 correspond to the two possible axial positions of the sleeve 18 in relation to the chuck body 4 and the ring 12.

In FIG. 1 the sleeve 18 is in the position in which the teeth 20 are in engagement with the gearing 21 of ring 12. The sleeve 18 is prevented from rotating by a key 30, which engages in axial groove 31 in chuck body 4.

Figure 6:
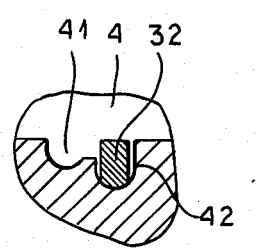
FIG. 6 is an enlarged partial vertical cross section taken along line VI—VI of FIG. 4 showing the details of the locking apparatus of this embodiment.
Figure 5:
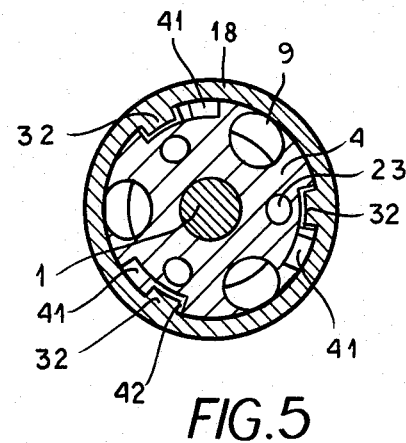
FIG. 5 is a cross section taken along the line V—V through the drill chuck of FIG. 4.

A second embodiment of this invention is shown in FIGS. 4 to 6. This embodiment differs from the foregoing in the details of the detent arrangement for holding the sleeve 18 in its two axial positions.

The detent members here comprise a plurality of axially running ribs 32 distributed circumferentially on the inner surface of the restraining casing 18 and projecting against the chuck body 4 so that each rib 32 engages in one of two axially extending notches 41 and 42 lying partially overlapped side-by-side in the circumferential direction in the chuck body 4.

Each pair of notches 41 and 42 is dimensioned such that one notch 41 is substantially shorter than the other notch 42 and the notches 41 and 42 overlap sideways circumferentially so that the rib 32 can be moved from one notch to the other by limited rotation of the sleeve 18. Thus sleeve 18 is shiftable between a configuration in which the ribs 32 engage the deeper notches 42 as shown in FIG. 5 or the shallower notches 41.

When the sleeve 18 sits in the deeper notches 42 it is in engagement with the ring 12 and held in position by the axially effective spring 34. When the sleeve 18 sits with the ribs 32 in the shallower notches 41, it is held out of engagement with the ring 12. The sleeve 18 is shifted between the two axial positions by lifting it against the force of spring 34 and rotating it.

Figure 7:
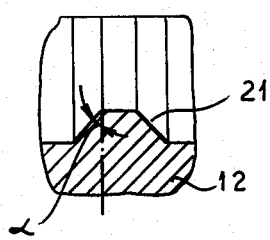
FIG. 7 is a section of a locking tooth showing the flank angle.

The flanks of the teeth 20 or the gearing 21 can engage at a flank angle $\alpha$ (FIG. 7) between 45° and 90°. With such an angle the ring may, if it is operated by means of the key and prior retraction of the sleeve 18 carelessly forgotten, cam the sleeve 18 from its locking engagement on the ring 12. In this embodiment sleeve 18 and ring 12 are pressed back together automatically by spring 34. The forces and motions occurring during the hammer drilling at the chuck jaws and neighboring parts are not sufficient to cause a pushing back of the sleeve 18 from engagement with the support ring 12.

The teeth 20 and the opposing gearing 21 can also be advantageously constructed to be saw-toothed in shape.

I claim:

1. In a drill chuck for a hammer drill having a rotatable chuck body connected to a drill spindle, said chuck body being formed with a tool holder for a drill bit and an open axial passage aligned therewith, said open passage being positioned so that a hammer effect can be transmitted through said open passage onto an end of said drill bit, said drill bit being engageable between a plurality of clamp jaws in said tool holder, said clamp jaws being fed through said rotatable chuck body, said clamp jaws being advanced and retracted by means of a rotatably adjustable and axially nonshiftable operating ring bearing an actuating jacket, a locking sleeve being provided on said chuck body so that it is shiftable axially between two axial positions, said locking sleeve having teeth on an end turned toward teeth on said ring, whereby said teeth mesh when said sleeve is shoved toward said ring to prevent undesired rotation during drilling, and wherein said teeth are out of engagement when said sleeve is drawn away from said ring, the improvement wherein said jacket is disposed with radial clearance from an outer surface of said chuck body so as to define a circular space between said chuck body and said jacket; said sleeve is engageable with said ring in said circular space and said jacket snugly overlaps said sleeve axially; and a plurality of cleaning passages are provided in said chuck body, each of said cleaning passages opening at one end onto an outer circumferential surface of said chuck body and at an opposite end into said tool holder, said passages being positioned to be cleared by said sleeve, mouths of said cleaning passages at said opposite ends being positioned adjacent said axial passage in said tool holder, said cleaning passages diverging toward a spindle side of said chuck body at an acute angle to a chuck axis.

2. The improvement defined in claim 1 wherein said jacket overlaps said sleeve casing so as to extend axially to cover an emptied portion of said circular space occurring when said sleeve is pushed back from said ring.

3. The improvement defined in claim 1 wherein each of said clamp jaws runs slantingly in a respective feed channel inclined to said chuck axis, so that said feed channels, and said cleaning passages all open onto said outer circumferential surface of said chuck body beyond said circular space axially at a position so as to be unblocked by said jacket.

4. The improvement defined in claim 3 wherein mouths of said cleaning passages and said feed channels at said outer circumferential surface are overlapped apronlike by said sleeve with radial clearance therefrom so as to define a free space between said chuck body and said sleeve axially open to the surroundings at a spindle side of said chuck body.

5. The improvement defined in claim 1 wherein said sleeve axially beyond said jacket is flush with said jacket.

6. The improvement defined in claim 1 wherein detent members are provided and positioned between said chuck body and said sleeve, said detent members holding said sleeve fixed in either one of two positions spaced axially from one another, said sleeve being held in engagement with said ring in one of said positions, but being held out of engagement with said ring in the other of said positions.

7. The improvement defined in claim 1 wherein said ring is rotatable by a key engageable in said chuck body, said key having a toothed edge engageable in a toothed rim of said ring, and wherein said locking teeth engage at a flank angle between 45° and 90°.

8. The improvement defined in claim 6 wherein said detent members comprise a plurality of axially extending ribs distributed circumferentially on the inner surface of said sleeve projecting toward said chuck body, each of said ribs engaging either one of two axially extending notches formed partially overlapping side-by-side in the circumferential direction in said chuck body, wherein one of said notches is substantially axially shallower than the other of said notches, said notches being constructed so that when said ribs engage less shallow notches said teeth engage, and when said ribs engage more shallow notches said teeth are out of engagement.

9. In a drill chuck for a hammer drill having a rotatable chuck body cnnected to a drill spindle, said chuck body being formed with a tool holder for a drill bit and an open axial passage aligned therewith, said open passage being positioned so that a hammer effect can be transmitted through said open passage onto an end of said drill bit, said drill bit being engageable between a plurality of clamp jaws in said tool holder, said clamp jaws being fed through said rotatable chuck body, said clamp jaws being advanced and retracted by means of a rotatably adjustable and axially nonshiftable operating ring bearing an actuating jacket, a locking sleeve being provided on said chuck body so that it is shiftable axially between two axial positions, said locking sleeve having teeth on an end turned toward teeth on said ring, whereby said teeth mesh when said sleeve is shoved toward said ring to prevent undesired rotation during drilling, and wherein said teeth are out of engagement when said sleeve is drawn away from said ring, the improvement wherein said jacket is disposed with radial clearance from an outer surface of said chuck body so as to define a circular space between said chuck body and said jacket; said sleeve is engageable with said ring in said circular space and said jacket snugly overlaps said sleeve axially; and a plurality of cleaning passages are provided in said chuck body, each of said cleaning passages opening at one end onto an outer circumferential surface of said chuck body and at an opposite end into said tool holder, said passages being positioned to be cleared by said sleeve, detent members being provided and positioned between said chuck body and said sleeve, said detent members holding said sleeve fixed in either one of two positions spaced axially from one another, said sleeve being held in engagement with said ring in one of said positions, but being held out of engagement with said ring in the other of said positions, said detent members being spring plates cut axially out of a wall of said sleeve, said plates being engageable by lock noses provided at free ends of said spring plates in either one of two recesses spaced axially from one another and provided in said chuck body.

* * * * *